Figure 1:
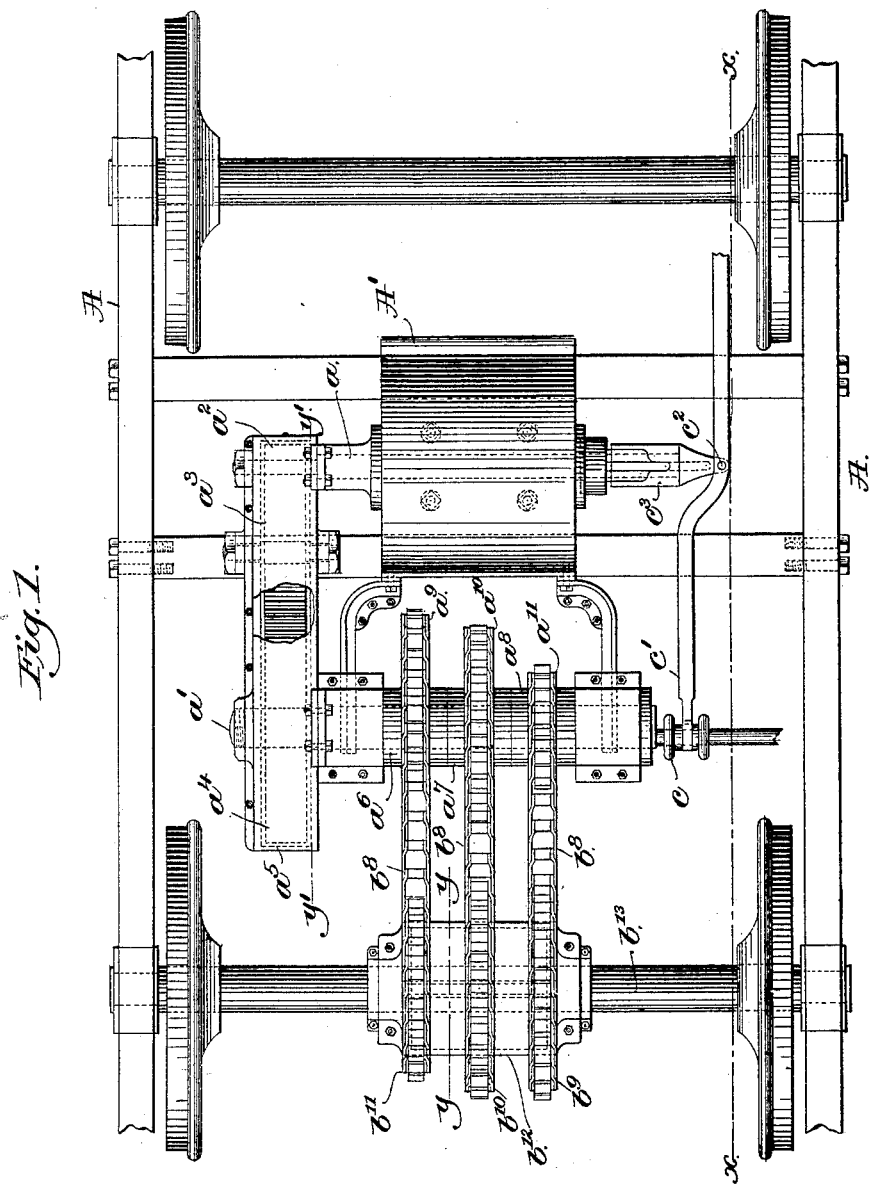

(No Model.) 2 Sheets—Sheet 1.

S. E. MOWER.
ELECTRIC MOTOR MECHANISM.

No. 450,970. Patented Apr. 21, 1891.

Witnesses.
Fred S. Greenleaf
Edward F. Allen

Inventor:
Samuel E. Mower,
by Crosby & Gregory attys.

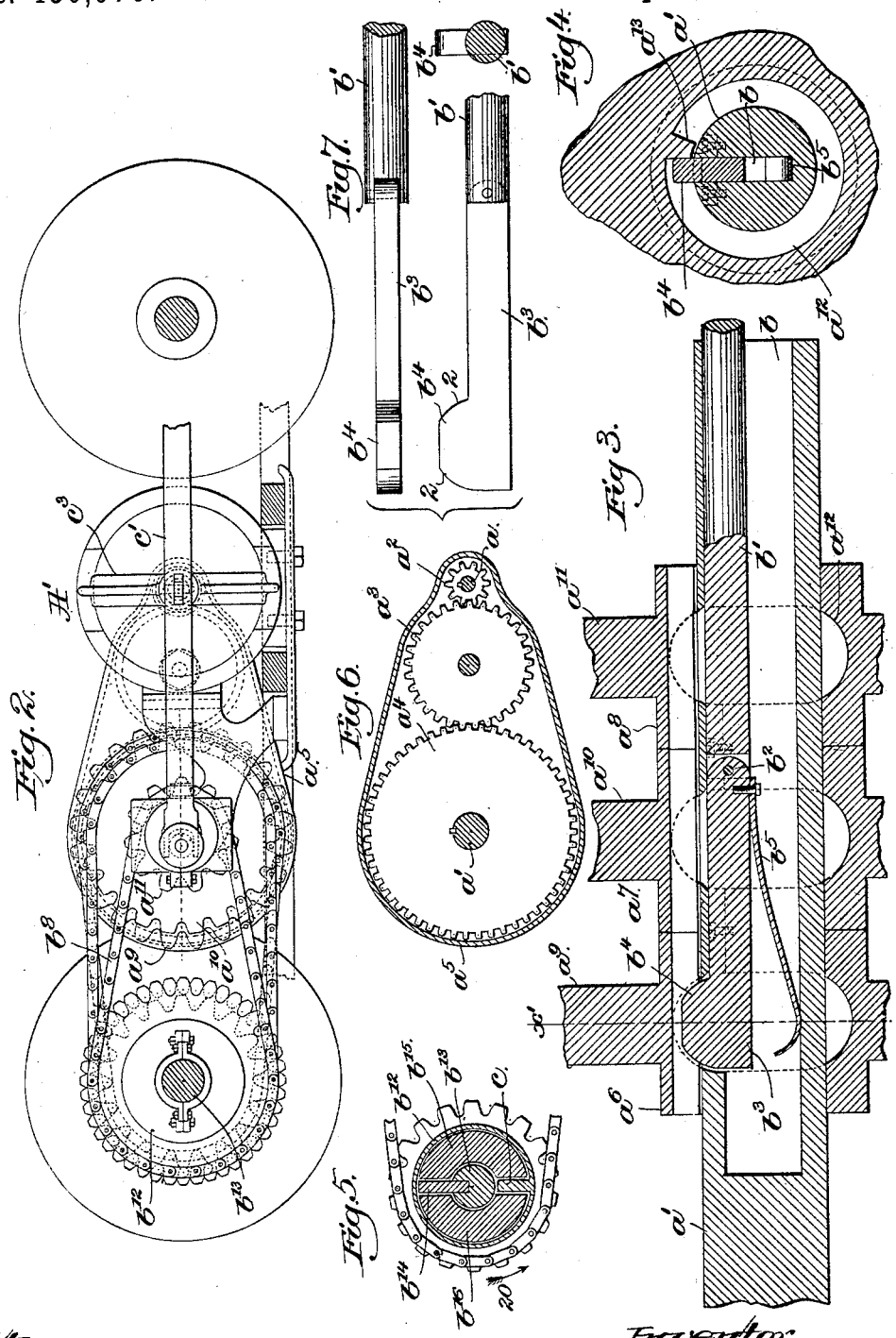

UNITED STATES PATENT OFFICE.

SAMUEL E. MOWER, OF NEW HAVEN, CONNECTICUT, ASSIGNOR TO HENRY G. THOMPSON & SONS, OF SAME PLACE.

ELECTRIC-MOTOR MECHANISM.

SPECIFICATION forming part of Letters Patent No. 450,970, dated April 21, 1891.

Application filed November 4, 1890. Serial No. 370,339. (No model.)

*To all whom it may concern:*

Be it known that I, SAMUEL E. MOWER, of New Haven, county of New Haven, State of Connecticut, have invented an Improvement in Electric-Motor Mechanism, of which the following description, in connection with the accompanying drawings, is a specification, like letters and figures on the drawings representing like parts.

This invention relates to motor mechanism especially adapted to be used on electric-railway cars, and has for its object to improve and simplify the construction of the same.

My invention therefore consists, essentially, in the combination of the following instrumentalities, viz: an axle, an electric motor, its armature, a counter-shaft, gearing connecting said armature and counter-shaft, a sprocket-wheel loose on said counter-shaft, a sprocket-wheel on said axle, means to connect said sprocket-wheels, and mechanism to render the loose sprocket-wheel fast on the counter-shaft, substantially as will be described.

Other features of my invention will be pointed out in the claims at the end of this specification.

Figure 1 is a top or plan view of a sufficient portion of an electric-railway-car truck and the motor mechanism supported thereby to enable my invention to be understood; Fig. 2, a section of the mechanism shown in Fig. 1 on line $x\ x$; Fig. 3, a longitudinal section, on an enlarged scale, of the mechanism for starting the car in motion; Fig. 4, a cross-section of the mechanism shown in Fig. 3 on line $x'$; Fig. 5, a sectional detail on the line $y\ y$, Fig. 1; Fig. 6, a sectional detail on line $y'\ y'$, Fig. 1; and Fig. 7, details to be referred to.

Referring to Fig. 1, the car-truck A, which may be of any usual or well-known construction, supports in suitable manner an electric motor A', having its armature-shaft $a$ (shown by dotted lines) connected to a counter or jack shaft $a'$ by suitable gears $a^2\ a^3\ a^4$, located, as herein shown, in a box or casing $a^5$, preferably dust and water tight and in practice containing oil or other lubricant.

The counter or jack shaft $a'$ is supported in suitable bearings and has mounted upon it loosely three hubs $a^6\ a^7\ a^8$, (see Fig. 3,) having secured to or forming part of them sprocket-wheels $a^9\ a^{10}\ a^{11}$. Each loose hub is provided with an annular recess $a^{12}$, (see Fig. 3,) and each hub on its inner circumference is provided with a projection $a^{13}$, extended into the annular recess $a^{12}$, for a purpose as will be described.

The counter or jack shaft $a'$ is provided with a slot $b$, into which is extended the starting mechanism for the car, it consisting, as herein shown, of a rod or plunger $b'$, having pivoted to it, as at $b^2$, a key $b^3$, provided, as herein shown, with an enlargement or lug $b^4$, preferably shaped to fit into the recess $a^{12}$ of the loose hubs. The key $b^3$ is normally pressed upward, so as to be forced into a recess $a^{12}$, preferably by a spring $b^5$ on its under side, the lug or ear $b^4$ on the key $b^3$, when brought opposite a recess $a^{12}$ in one of the loose hubs, slipping into said recess and engaging the projection $a^{13}$ on the loose hub, into whose recess the said lug has been forced by the spring $b^5$. In this manner that particular loose hub with which the lug $b^4$ engages is practically made fast to the shaft $a'$, so as to revolve with the said shaft.

The sprocket-wheels $a^9\ a^{10}\ a^{11}$ on the loose hubs are of different sizes or diameters and are connected, as herein shown, by sprocket-chains $b^8$ with sprocket-wheels $b^9\ b^{10}\ b^{11}$ on a drum $b^{12}$, loosely mounted on one of the car-axles $b^{13}$. The drum $b^{12}$ (see Fig. 5) is provided with an upright or shoulder $c$, extended, preferably, the length of the drum, and the car-axle $b^{13}$ is provided with a spline or feather $b^{14}$, extended substantially the length of the drum, the said projection and spline being substantially in line with each other, as herein shown, to practically divide the drum into halves or chambers in which are placed buffers $b^{15}\ b^{16}$, preferably made of rubber, but which may be springs or of any other usual yielding material. The buffers $b^{15}\ b^{16}$ serve to take up shock and relieve the motor mechanism from strain caused by a sudden starting of the car, as will be described.

The rod $b'$ of the starting mechanism may be operated in any usual or well-known manner, it being herein shown as provided with a collar or hub $c$, to which is secured one end of a lever $c'$, pivoted, as at $c^2$, to a suitable casting $c^3$, herein shown as secured to the frame of the motor.

In practice the sprocket-wheels on the loose hubs are of suitable size to obtain varying degrees of speed as may be desired—as, for instance, when the sprocket-wheel $a^9$ is made fast to the counter-shaft the car may be supposed to be traveling at full speed, and when the sprocket-wheel $a^{10}$ is made fast to the said counter-shaft the car may be supposed to be traveling at one-half speed, while when the sprocket-wheel $a^{11}$ is made fast to the counter-shaft the car may be supposed to be traveling at one-quarter speed. In this way it will be seen that any desired speed may be obtained by making the sprocket-wheels on the loose hubs of any desired diameter or size.

In practice the armature of the motor is rotated continuously, and the counter-shaft $a'$ is also being rotated continuously through the gears $a^2$ $a^3$ $a^4$. If the starting-rod $b'$ has been moved into such position as to bring the lug or ear $b^4$ on the key $b^3$ into engagement with a portion of the loose hubs intermediate of adjacent recesses $a^{12}$, the counter-shaft $a'$ will be revolved without producing any motion of any of the sprocket-wheels $a^9$ $a^{10}$ $a^{11}$, and consequently the car will remain at rest. If now it is desired to operate the car from a position at rest—at, say, one-quarter speed— the rod $b'$ through the lever $c'$ will be moved longitudinally in the slot $b$ of the counter-shaft until the lug or ear $b^4$ on the key $b^3$ is brought in line with the recess $a^{12}$ of the loose hub $a^8$, and when opposite the said recess the key $b^3$ will be forced outward by its spring $b^5$ and the lug $b^4$ projected into the said recess, so that on the continued revolution of the counter-shaft the projecting lug $b^4$ will engage the projection $a^{13}$ of the loose hub $a^8$ and will carry the said hub with it as the counter-shaft continues to revolve, thus practically making the hub $a^8$ fast on the shaft $a'$. When the loose hub $a^8$ is set in motion, the drum $b^{12}$ on the car-axle will be revolved through the sprocket-wheel $b^9$ and the chain $b^8$, connecting the said sprocket-wheel on the drum with the sprocket-wheel $a^{11}$ on the hub $a^8$, and if the rotation of the drum is in the direction of arrow 20, Fig. 5, the upright $c$ will compress the buffer $b^{15}$ against the spline $b^{14}$ on the car-axle, and will thus gradually set the car-axle in motion, the buffer $b^{15}$ gradually yielding, and thereby preventing unnecessary strain or shock on the operating parts. If the car-axle is to be revolved in the opposite direction, the buffer $b^{16}$ will strike the spline $b^{14}$. If after the car has attained a rate of speed equal to one-third of its full capacity and it is desired to increase the speed to the full or normal amount, the driver or other operator pushes in the rod $b'$ to engage the lug $b^4$ with the projection on the loose hub $a^6$. The lug or projection $b^4$ is rounded at its ends, as at 2, and the edges of the recesses $a^{12}$ of the loose hubs are rounded or made oblique in like manner, so that the key $b^3$ may be easily disengaged from any one recess $a^{12}$—that is, so that the starting-rod $b'$ may be readily moved in either direction.

I have herein shown the counter or jack shaft $a'$ as provided with three loose sprocket-wheels; but I do not desire to limit my invention in this respect, as the number of sprocket-wheels may be varied as desired.

I claim—

1. The combination of the following instrumentalities, viz: an axle, an electric motor, its armature, a counter-shaft continuously rotated by said motor, gearing connecting said armature and counter-shaft, and a casing to contain oil inclosing the gearing, a sprocket-wheel loose on said counter-shaft, a sprocket-wheel on said axle, means to connect said sprocket-wheels, and mechanism contained within said counter-shaft to render the loose sprocket-wheel fast on the counter-shaft, substantially as described.

2. The combination of the following instrumentalities, viz: an axle, an electric motor, its armature, a counter-shaft continuously rotated by said motor, gearing connecting said armature and counter-shaft, and a speed-reducing mechanism connecting said counter-shaft with the said axle and consisting of a series of sprocket-wheels loose on the counter-shaft and of different diameters, and sprocket-wheels on the axle, means to connect said wheels in each series, and mechanism within said counter-shaft to render one or other of said loose wheels fast on the counter-shaft, substantially as described.

3. The combination, with a car-axle and sprocket-wheels mounted thereon, of a counter-shaft, a longitudinal slot therein, a rod movable therein and having pivoted thereto a spring-controlled key provided with a lug or ear, sprocket-wheels loose on said counter-shaft, having hubs, each provided on their inner circumference with an annular recess, and a projection extended into said recess, said key being adapted to engage with one or other of said projections to rotate the respective hub with the counter-shaft, connections between the two sets of sprocket-wheels, and gearing connecting the counter-shaft with the armature-shaft of the motor, substantially as described.

4. The combination of the following instrumentalities, viz: a car-axle provided with a spline or projection, a drum loose on said axle and provided with a projection on its inner side, cushions in said drum on opposite sides of the projection and sprocket-wheels on said drum, a counter-shaft provided with a longitudinal slot, a rod movable in said slot and provided with a key having a lug or ear, hubs loose on said counter-shaft, provided each on their inner circumference with an annular recess, and a projection extended into said recess to co-operate with the lug or ear of the key to rotate the hub with the counter-shaft, an electric motor, and gearing connecting the counter-shaft with the armature-shaft of the motor, substantially as described.

In testimony whereof I have signed my name to this specification in the presence of two subscribing witnesses.

SAMUEL E. MOWER.

Witnesses:
L. H. DAYTON,
HENRY G. THOMPSON.